United States Patent
Wienand et al.

(10) Patent No.: US 6,819,217 B2
(45) Date of Patent: Nov. 16, 2004

(54) TEMPERATURE SENSOR

(75) Inventors: Karl-Heinz Wienand, Aschaffenburg (DE); Thomas Loose, Linsengericht (DE)

(73) Assignee: Heraeus Sensor Technology GmbH, Hanau (DE)

( * ) Notice: Subject to any disclaimer, the term of this patent is extended or adjusted under 35 U.S.C. 154(b) by 0 days.

(21) Appl. No.: 10/387,016

(22) Filed: Mar. 11, 2003

(65) Prior Publication Data

US 2003/0174041 A1 Sep. 18, 2003

(30) Foreign Application Priority Data

Mar. 12, 2002 (DE) .......................................... 102 10 772

(51) Int. Cl.$^7$ ................................................ H01C 3/04
(52) U.S. Cl. .......................................... 338/25; 338/28
(58) Field of Search ..................................... 338/25, 28

(56) References Cited

U.S. PATENT DOCUMENTS

| | | | |
|---|---|---|---|
| 4,378,489 A | | 3/1983 | Chabinsky et al. |
| 4,719,442 A | * | 1/1988 | Bohara et al. .............. 338/25 |
| 5,332,991 A | * | 7/1994 | Kojima et al. .............. 338/25 |
| 5,448,068 A | * | 9/1995 | Lee et al. ................ 250/338.3 |
| 5,814,149 A | * | 9/1998 | Shintani et al. ............. 117/104 |
| 6,118,166 A | | 9/2000 | Shoji et al. |
| 6,229,121 B1 | | 5/2001 | Jang et al. |
| 6,450,025 B1 | * | 9/2002 | Wado et al. ............. 73/204.26 |
| 6,557,411 B1 | * | 5/2003 | Yamada et al. .......... 73/204.26 |
| 2002/0015793 A1 | * | 2/2002 | Lee et al. ................. 427/383.1 |

FOREIGN PATENT DOCUMENTS

| | | |
|---|---|---|
| DE | 32 05 704 A1 | 9/1983 |
| DE | 198 48 524 C1 | 12/1999 |
| JP | 60-64401) * | 4/1985 |
| RU | 2069324 C1 | 11/1996 |
| RU | 2 069 324 C1 | 11/1996 |
| WO | WO 87/05146 A1 | 8/1987 |

OTHER PUBLICATIONS

JP63055198 Derwent abstract only Mar. 1988.*
The Materials Science of Thin Films, Ohring, M. "Epitaxy" Chs. 7.1–7.2 (1992).*
Lairson et al. Epitaxial Pt(001), Pt(110), and Pt (111) films on MgO(001), (110), (111) and All2O3(0001) Ap.Phys Lett. 61, Sep. 21, 1992, pp. 1390–1392.*
Lairson, B.M., et al., "Epitaxial Pt(001), Pt(110), and Pt(111) films on MgO(001), MgO(11,0), MgO(111), and Al$_2$O$_3$(0001)", *Appl. Phys. Lett.*, 61(12), pp. 1390–1392, (Sep. 1992).
Alex I.K. LAO$^a$ et al., "Precise temperature control of microfluidic chamber for gas and liquid phase reactions", *Sensors and Actuators*, vol. 84, pp. 11–17, (2000).
John Pritchard, "Platinum Resistance Thermometers On Film", *C&I*, pp. 114, 116 & 119, (Jun. 1986).
Charles Kittel, "Einführung in die Festkörperphysik", *R. Oldenbourg Verlag München Wien*, pp. 43–46, (1976).

* cited by examiner

*Primary Examiner*—Karl D. Easthom
(74) *Attorney, Agent, or Firm*—Akin Gump Strauss Hauer & Feld, LLP

(57) ABSTRACT

A temperature sensor is provided with a temperature-sensitive element on a surface of a monocrystalline substrate, wherein the temperature-sensitive element is made of a platinum thin-film resistor and is produced as an epitaxial layer. The monocrystalline substrate can be an electrically insulating material, preferably α-Al$_2$O$_3$ or MgO. Alternatively, the substrate may be an electrically conducting material, such as silicon, with an electrically insulating epitaxial layer arranged between the substrate and the platinum thin-film resistor. The platinum thin-film resistor epitaxial layer is preferably deposited by physical vapor deposition (PVD), chemical vapor deposition (CVD), or molecular beam epitaxy (MBE).

18 Claims, No Drawings

TEMPERATURE SENSOR

BACKGROUND OF THE INVENTION

The invention relates to a temperature sensor with a temperature-sensitive element on a surface of a monocrystalline substrate, wherein the temperature-sensitive element is made of a platinum thin-film resistor. The invention further relates to a process for manufacturing such a temperature sensor as well as a use for it.

Temperature sensors with a platinum thin-film resistor on a monocrystalline substrate are known. Thus, Russian Patent RU 2069324 describes a temperature-measuring device with a dielectric substrate and a thin-film resistor applied thereon in the form of a meander made of nickel or platinum. Between the platinum layer and the substrate is a layer of adhesive agent made of titanium nitride. Sapphire, for example, has been disclosed as a dielectric substrate.

U.S. Pat. No. 6,229,121 B1 discloses a micro switch with a bimetallic switch contact that has a meander-shaped heating element on an epitactic layer and a temperature-sensitive element, for example as a platinum thin-film resistor.

International Patent Publication WO 87/05146 describes a temperature sensor with an insulated substrate, for example made of sapphire. A platinum thin-film resistor is provided as a temperature sensor which is protected with a cover layer.

German Published Patent Application DE 32 05 704 A1 discloses a device to evaluate the climate in a room using a temperature sensor element, which has a platinum thin-film resistor in the form of a meander on a substrate made of sapphire, for example.

U.S. Pat. No. 4,378,489 describes a measuring arrangement with a platinum thin-film resistor and a heating element on a sapphire support.

In order to be able to attain a further geometric size reduction of temperature sensors containing platinum thin-film resistors, ever thinner and longer conductor paths must be produced on smaller and smaller substrate surfaces. The crystalline platinum thin-film resistors produced up to this point for temperature sensors are technically feasible beginning at a conductor path width of approximately >10 $\mu$m, since at a smaller width the conducting electrons leak at the platinum grain boundaries and the temperature coefficient cc of the electrical resistance of platinum vanishes. In addition, in structuring the crystalline platinum thin-film resistor, for example by etching, voids can occur in the conduction path, which can be traced back to the platinum crystallites, their shape, size and orientation.

BRIEF SUMMARY OF THE INVENTION

Therefore, the problem becomes one of producing a temperature sensor with a platinum thin-film resistor as a temperature-sensitive element in which it is possible to reduce the conductor path width and conductor path separation of the platinum thin-film resistor to < about 10 $\mu$m. Moreover, a suitable process to manufacture such a temperature sensor should be provided.

The problem is solved for the temperature sensor in that the platinum thin-film resistor is constructed as an epitaxial layer. An epitaxial layer is understood as a monocrystalline layer produced on a monocrystalline substrate by epitaxy. If the platinum thin-film resistor is constructed as an epitaxial layer, it is then very easy to etch due to its single crystal character, and error-free conductor path widths and path separations of < about 10 $\mu$m can be produced. The temperature coefficient $\alpha$ of the electrical resistance of the platinum remains intact, since there is no longer any leakage of conducting electrons at the grain boundaries. With the ability to construct thinner and thus longer conductor paths on a substrate, electrical resistors of > about 10 k$\Omega$ can be attained for the platinum thin-film resistor without any problem.

The problem is solved for the process in that the epitaxial layer(s) is/are deposited by PVD (physical vapor deposition) or CVD (chemical vapor deposition) or MBE (molecular beam epitaxy).

DETAILED DESCRIPTION OF THE INVENTION

It has proven to be beneficial if the monocrystalline substrate is made of an electrically insulating material, preferably $\alpha$-$Al_2O_3$ or MgO.

Use of these substrates for epitaxial layers of platinum is known from the publication Lairson, B. M. et al, "Epitaxial Pt(001), Pt(110), and Pt(111) films on MgO(001), MgO (110), MgO(111) and $Al_2O_3$(0001)," Appl. Phys. Lett. 61(12): 1390–1392 (1992). This publication describes the production of epitaxial platinum layers on monocrystalline substrates made of MgO or $Al_2O_3$ and cites various manufacturing methods, such as molecular beam epitaxy, laser ablation, cathode sputtering or chemical vapor phase deposition.

In particular, it is preferred if the monocrystalline substrate is made of $\alpha$-$Al_2O_3$, with the surface of the substrate aligned parallel to the crystallographic (110) plane of the $\alpha$-$Al_2O_3$ and if the platinum of the platinum thin-film resistor is grown in the (111) plane or in the (110) plane or in the (100) plane parallel to the surface.

However, it is even advantageous if the monocrystalline substrate is made of $\alpha$-$Al_2O_3$ with the surface of the substrate aligned parallel to the crystallographic (001) plane of the $\alpha$-$Al_2O_3$ and if the platinum of the platinum thin-film resistor is grown in the (111) plane or in the (110) plane or in the (100) plane parallel to the surface.

It has further shown to be beneficial if the monocrystalline substrate is made of $\alpha$-$Al_2O_3$ with the surface of the substrate aligned parallel to the crystallographic (110) plane of the $\alpha$-$Al_2O_3$ and if the platinum of the platinum thin-film resistor is grown in the (111) plane or in the (110) plane or in the (100) plane parallel to the surface.

Furthermore, it has been shown to be worthwhile if the monocrystalline substrate is made of MgO, wherein the surface of the substrate is parallel to the crystallographic (111) plane of the MgO and if the platinum of the platinum thin-film resistor is grown in the (111) plane or in the (110) plane or in the (100) plane parallel to the surface.

It has further shown to be beneficial if the monocrystalline substrate is made of MgO, wherein the surface of the substrate is parallel to the crystallographic (001) plane of the MgO and if the platinum of the platinum thin-film resistor is grown in the (111) plane or in the (110) plane or in the (100) plane parallel to the surface.

Furthermore, it has been shown to be worthwhile if the monocrystalline substrate is made of MgO, wherein the surface of the substrate is parallel to the crystallographic (110) plane of the MgO and if the platinum of the platinum thin-film resistor is grown in the (111) plane or in the (110) plane or in the (100) plane parallel to the surface.

A seed layer with a thickness of up to about 2 nm can be arranged between the monocrystalline substrate and the platinum thin-film resistor.

The monocrystalline substrate can also be made of an electrically conducting material, for example silicon, wherein an electrically insulating epitaxial layer is arranged between the substrate and the platinum thin-film resistor.

Here, it has been shown to be worthwhile if the surface of the substrate is produced parallel to the crystallographic (111) plane of silicon. The platinum of the platinum thin-film resistor is then grown preferably in the (111) plane parallel to the surface.

A seed layer with a thickness of up to about 2 nm can be arranged between the electrically conducting substrate and the electrically insulating epitaxial layer and/or between the electrically insulating epitaxial layer and the platinum thin-film resistor.

Preferably, the platinum thin-film resistor is made of conductor paths that have a conductor path width in a range of about 1 to 10 μm. The conductor paths preferably describe a meander, wherein adjacent conductor paths are arranged at a distance of about 1 to 10 μm from one another. Ideally, the conductor paths have a thickness of about 0.05 μm to 2 μm.

The conductor paths have a preferred temperature coefficient α for the electrical resistance of greater than about 0.00350/K.

An ideal use of an epitaxial platinum thin-film on a monocrystalline substrate is as a platinum thin-film resistor for a temperature sensor.

The following Examples 1 through 3 are intended to explain the invention in exemplary fashion without limiting the invention thereto. The outer appearance of a temperature sensor with a platinum thin-film resistor is already sufficiently known, for example from Russian Patent RU 2069324, so that a drawing illustration would be superfluous.

EXAMPLE 1

On a monocrystalline substrate made of α-$Al_2O_3$, whose surface runs parallel to the crystallographic (110) plane, a meander-shaped platinum thin-film resistor is produced by cathode sputtering. The platinum thin-film resistor consists of an epitaxial layer that is grown in the (110) plane parallel to the surface of the substrate and that has a thickness of 1 μm. The conductor paths, from which the meander-shaped platinum thin-film resistor is created, have a conductor path width and a spacing from one another of 3 μm, respectively.

EXAMPLE 2

On a monocrystalline substrate made of MgO, whose surface runs parallel to the crystallographic (001) plane, a meander-shaped platinum thin-film resistor is produced by CVD. The platinum thin-film resistor consists of an epitaxial layer that is grown in the (110) plane parallel to the surface of the substrate and that has a thickness of 0.5 μm. The conductor paths, from which the meander-shaped platinum thin-film resistor is created, have a conductor path width of 5 μm and a spacing from one another of 1.5 μm. A seed layer of Fe with a thickness of 0.5 nm is placed between the substrate and the platinum thin-film resistor.

EXAMPLE 3

On a monocrystalline substrate made of silicon, whose surface runs parallel to the crystallographic (111) plane, an electrically insulating epitaxial layer made of MgO is produced by cathode sputtering that is grown in the (111) plane parallel to the surface of the substrate and that has a thickness of 2 μm. On the electrically insulating epitaxial layer made of MgO, a meander-shaped platinum thin-film resistor is produced by cathode sputtering. The platinum thin-film resistor consists of an epitaxial layer that is grown in the (111) plane parallel to the surface of the substrate and that has a thickness of 1.5 μm. The conductor paths, from which the meander-shaped platinum thin-film resistor is created, have a conductor path width of 6 μm and a spacing from one another of 5 μm.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A temperature sensor comprising a temperature-sensitive element on a surface of a monocrystalline substrate, wherein the temperature-sensitive element comprises a platinum thin-film resistor, wherein the platinum thin-film resistor comprises at least one epitaxial layer, wherein the platinum thin-film resistor is formed of conductor paths having a conductor path width of about 1 to 10 μm, wherein the conductor paths have a thickness of about 0.05 to 2 μm, and wherein the conductor paths have a temperature coefficient α for electrical resistance of greater than about 0.00350/K.

2. The temperature sensor according to claim 1, wherein the monocrystalline substrate comprises an electrically insulating material.

3. The temperature sensor according to claim 2, wherein the monocrystalline substrate comprises α-$Al_2O_3$ or MgO.

4. The temperature sensor according to claim 3, wherein the monocrystalline substrate comprises α-$Al_2O_3$, wherein a surface of the substrate is aligned parallel to the crystallographic (110) plane of the α-$Al_2O_3$, and wherein the platinum of the platinum thin-film resistor is grown in the (111) plane or in the (110) plane or in the (100) plane parallel to the surface.

5. The temperature sensor according to claim 3, wherein the monocrystalline substrate comprises α-$Al_2O_3$, wherein a surface of the substrate is aligned parallel to the crystallographic (001) plane of the α-$Al_2O_3$, and wherein the platinum of the platinum thin-film resistor is grown in the (111) plane or in the (110) plane or in the (100) plane parallel to the surface.

6. The temperature sensor according to claim 3, wherein the monocrystalline substrate comprises α-$Al_2O_3$, wherein a surface of the substrate is aligned parallel to the crystallographic (1–10) plane of the α-$Al_2O_3$, and wherein the platinum of the platinum thin-film resistor is grown in the (111) plane or in the (110) plane or in the (100) plane parallel to the surface.

7. The temperature sensor according to claim 3, wherein the monocrystalline substrate comprises MgO, wherein a surface of the substrate is aligned parallel to the crystallographic (111) plane of the MgO, and wherein the platinum of the platinum thin-film resistor is grown in the (111) plane or in the (110) plane or in the (100) plane parallel to the surface.

8. The temperature sensor according to claim 3, wherein the monocrystalline substrate comprises MgO, wherein a surface of the substrate is aligned parallel to the crystallographic (001) plane of the MgO, and wherein the platinum of the platinum thin-film resistor is grown in the (111) plane or in the (110) plane or in the (100) plane parallel to the surface.

9. The temperature sensor according to claim 3, wherein the monocrystalline substrate comprises MgO, wherein a surface of the substrate is aligned parallel to the crystallographic (110) plane of the MgO, and wherein the platinum of the platinum thin-film resistor is grown in the (111) plane or in the (110) plane or in the (100) plane parallel to the surface.

10. The temperature sensor according to claim 1, wherein a seed layer having a thickness of up to about 2 nm is arranged between the substrate and the platinum thin-film resistor.

11. The temperature sensor according to claim 1, wherein the monocrystalline substrate comprises an electrically conducting material, and an electrically insulating epitaxial layer is arranged between the substrate and the platinum thin-film resistor.

12. The temperature sensor according to claim 11, wherein the monocrystalline substrate comprises silicon.

13. The temperature sensor according to claim 12, wherein a surface of the substrate is parallel to the crystallographic (111) plane of the silicon.

14. The temperature sensor according to claim 13, wherein the platinum of the platinum thin-film resistor is grown in the (111) plane parallel to the surface.

15. The temperature sensor according to claim 11, wherein a seed layer having a thickness of up to about 2 nm is arranged between the substrate and the electrically insulating epitaxial layer and/or between the electrically insulating epitaxial layer and the platinum thin-film resistor.

16. The temperature sensor according to claim 1, wherein the conductor paths describe a meander and adjacent conductor paths are arranged at a spacing from one another of about 1 to 10 $\mu$m.

17. A process for manufacturing a temperature sensor according to claim 1, wherein the epitaxial layer(s) is/are deposited by a method selected from the group consisting of physical vapor deposition, chemical vapor deposition, and molecular beam epitaxy.

18. A platinum thin-film resistor for a temperature sensor, comprising an epitactic platinum thin-film on a monocrystalline substrate wherein the platinum thin-film resistor is formed of conductor paths having a conductor path width of about 1 to 10 $\mu$m, wherein the conductor paths have a thickness of about 0.05 to 2 $\mu$m, and wherein the conductor paths have a temperature coefficient $\alpha$ for electrical resistance of greater than about 0.00350/K.

* * * * *